US008943596B2

(12) United States Patent
Belov (10) Patent No.: US 8,943,596 B2
(45) Date of Patent: Jan. 27, 2015

(54) SYSTEM AND METHOD FOR IMPROVING THE EFFICIENCY OF APPLICATION EMULATION ACCELERATION (71) Applicant: Kaspersky Lab ZAO, Moscow (RU)

(72) Inventor: Sergey Y. Belov, Moscow (RU)

(73) Assignee: Kaspersky Lab ZAO, Moscow (RU)

( * ) Notice: Subject to any disclaimer, the term of this patent is extended or adjusted under 35 U.S.C. 154(b) by 0 days.

(21) Appl. No.: 13/852,778

(22) Filed: Mar. 28, 2013

(65) Prior Publication Data
US 2014/0181970 A1 Jun. 26, 2014

(30) Foreign Application Priority Data
Dec. 25, 2012 (RU) .................. 2012156445

(51) Int. Cl.
H04L 29/06 (2006.01)
G06F 9/455 (2006.01)
G06F 21/56 (2013.01)
(52) U.S. Cl.
CPC ........ G06F 9/45508 (2013.01); G06F 9/45516 (2013.01); G06F 21/566 (2013.01); G06F 2009/45591 (2013.01)
USPC ................................ 726/24; 726/15; 713/168
(58) Field of Classification Search
CPC ........................... H04L 63/145; H04L 63/0272
USPC .......................................................... 726/24
See application file for complete search history.

(56) References Cited
U.S. PATENT DOCUMENTS

| 5,398,196 A | 3/1995 | Chambers |
| 5,751,982 A | 5/1998 | Morley |
| 5,796,989 A * | 8/1998 | Morley et al. ................... 703/26 |
| 5,978,917 A | 11/1999 | Chi |
| 6,021,510 A | 2/2000 | Nachenberg |
| 6,026,230 A | 2/2000 | Lin |
| 6,094,731 A | 7/2000 | Waldin |

(Continued)

FOREIGN PATENT DOCUMENTS

| EP | 2237186 | 10/2010 |
| WO | WO2010132860 | 11/2010 |

OTHER PUBLICATIONS

Adams, Keith, Agesen, Ole, "Proceedings of the 12th international conference on Architectural support for programming languages and operating systems", pp. 2-13, 2006.*

(Continued)

Primary Examiner — Mohammad L Rahman
(74) Attorney, Agent, or Firm — Patterson Thuente Pederson, P.A.

(57) ABSTRACT

An improved emulator for analyzing software code, and associated method. The emulator includes a virtual execution environment in which a series of virtual processing states are represented during emulation of a first portion of the software code, and a hardware accelerator that performs an initialization of the computing hardware to directly execute a second portion of the software code under investigation without emulation thereof in the virtual execution environment. An efficiency assessment module determines a measure of efficiency of performing the executing of the second portion of the software code under investigation without emulation thereof, and an acceleration decision module performs selection of the second portion of the software code under investigation to be directly executed by the hardware accelerator module based on the determined measure of efficiency.

18 Claims, 5 Drawing Sheets

(56) References Cited

U.S. PATENT DOCUMENTS

| | | |
|---|---|---|
| 6,357,008 B1 | 3/2002 | Nachenberg |
| 6,385,718 B1 * | 5/2002 | Crawford et al. ............. 712/227 |
| 6,631,514 B1 | 10/2003 | Le |
| 6,763,452 B1 | 7/2004 | Hohensee |
| 6,934,832 B1 | 8/2005 | Van Dyke |
| 6,941,545 B1 | 9/2005 | Reese |
| 6,978,462 B1 | 12/2005 | Adler |
| 7,010,698 B2 | 3/2006 | Sheymov |
| 7,013,456 B1 | 3/2006 | Van Dyke |
| 7,203,934 B2 * | 4/2007 | Souloglou et al. ............ 717/146 |
| 7,234,167 B2 | 6/2007 | Teblyashkin |
| 7,370,361 B2 | 5/2008 | De Los Santos |
| 7,469,419 B2 | 12/2008 | Sobel |
| 7,475,288 B2 | 1/2009 | Multhaup |
| 7,555,592 B1 | 6/2009 | Koryakin |
| 7,603,713 B1 | 10/2009 | Belov |
| 7,620,992 B2 | 11/2009 | Monastyrsky |
| 7,624,449 B1 | 11/2009 | Perriot |
| 7,636,856 B2 | 12/2009 | Gheorghescu |
| 7,752,432 B2 | 7/2010 | Sheymov |
| 7,900,258 B2 | 3/2011 | Van Der Made |
| 8,060,356 B2 * | 11/2011 | Sargaison ...................... 703/26 |
| 8,069,372 B2 | 11/2011 | Natvig |
| 8,122,509 B1 | 2/2012 | Belov |
| 8,151,352 B1 | 4/2012 | Novitchi |
| 8,166,276 B2 | 4/2012 | Serebrin |
| 8,176,477 B2 | 5/2012 | Wu |
| 2002/0116635 A1 | 8/2002 | Sheymov |
| 2003/0093775 A1 | 5/2003 | Hilton |
| 2003/0115479 A1 | 6/2003 | Edwards |
| 2005/0071824 A1 | 3/2005 | K. N. et al. |
| 2005/0177736 A1 | 8/2005 | De Los Santos |
| 2005/0268338 A1 | 12/2005 | Made |
| 2006/0143522 A1 * | 6/2006 | Multhaup et al. ............... 714/28 |
| 2006/0212723 A1 | 9/2006 | Sheymov |
| 2007/0038867 A1 | 2/2007 | Verbauwhede |
| 2007/0136455 A1 | 6/2007 | Lee |
| 2008/0040710 A1 | 2/2008 | Chiriac |
| 2008/0167853 A1 | 7/2008 | Fernsler |
| 2008/0263659 A1 | 10/2008 | Alme |
| 2008/0271147 A1 | 10/2008 | Mohanan |
| 2009/0006074 A1 | 1/2009 | Green |
| 2009/0077544 A1 | 3/2009 | Wu |
| 2009/0126016 A1 | 5/2009 | Sobko |
| 2009/0165138 A1 | 6/2009 | Stewart |
| 2009/0187902 A1 * | 7/2009 | Serebrin ........................... 718/1 |
| 2010/0023810 A1 * | 1/2010 | Stolfo et al. .................... 714/38 |
| 2010/0107252 A1 | 4/2010 | Mertoguno |
| 2012/0023492 A1 * | 1/2012 | Govindan et al. ................. 718/1 |
| 2012/0060220 A1 | 3/2012 | Kerseboom et al. |
| 2012/0096554 A1 | 4/2012 | Stranne |
| 2012/0300649 A1 * | 11/2012 | Parmar et al. ................. 370/252 |

OTHER PUBLICATIONS

Debray et al., "Complier Techniques for Code Compaction", The University of Arizona. ACM Transactions on Programming Languages and Systems. vol. 22, No. 2, Mar. 2000.

Lorenzo Martignoni et al: "OmniUnpack: Fast, Generic, and Safe Unpacking of Malware", Computer Security Applications Conference, 2007. ACSAC 2007. Twenty-Third Annual, Dec. 1, 2007, pp. 431-441.

\* cited by examiner

FIG. 5

SYSTEM AND METHOD FOR IMPROVING THE EFFICIENCY OF APPLICATION EMULATION ACCELERATION

PRIOR APPLICATION

This Application claims the benefit of Russian Federation Patent Application No. 2012156445, filed Dec. 25, 2012, incorporated by reference herein.

FIELD OF THE INVENTION

The invention relates generally to information processing and security technologies and, more particularly, to automated selective emulation of software code subject to functional analysis.

BACKGROUND OF THE INVENTION

The structure of today's programs, including malicious ones, is a complex set of instructions: transitions, procedure calls, cycles, etc. It should be noted that the complexity of executable files is constantly increasing, which is due to the growing popularity of high-level programming languages and to the sophistication of computer equipment and operating systems. Malicious applications can perform a number of specific actions, such as: stealing passwords and other confidential user data, connecting a computer to a bot network in order to carry out denial of service (DoS) attacks or send spam, interfering with the proper functioning of the system in order to extort money from the user with promises to restore operability (e.g., ransomware), and other actions, negative and undesirable from the user's point of view.

One of the known methods for examining a potentially malicious program is based on the use of an emulator applied as part of an antivirus application to analyze program behavior. There are various methods of program emulation. In one approach, the emulator is programmed to imitate an actual processor, memory and other devices by creating virtual copies of the registries of the processor, memory and processor instruction set. This way, program instructions are executed not on an actual processor, but on its virtual representation, in which system API function calls are intercepted in the emulator and imitated, e.g., expected replies are sent back to the emulated application.

During emulation, the execution of processor instructions is typically carried out by dynamic translation of instructions. Dynamic translation involves translating the instructions from an initial set (i.e. the original instructions to be emulated) into a dedicated set of instructions to be executed using the emulator. Dynamic translation is discussed below using the translation of one instruction as an example:

Initial instruction:
mov eax, [edi]
The translated pseudocode involves the following set of steps:
1. Reading the edi
2. Reading the memory at the address received in the 1st operation
3. Writing the value read from the memory in the 2nd operation to eax In addition, each step of such pseudocode will contain a certain number of machine instructions; as a result, one initial instruction, when translated, causes the execution of tens or even hundreds of instructions in the processor. It should be noted that, once translated, the code does not need to be translated again at another execution, because the code translation operation has already been executed. Taking into account that most of the code is executed within cycles, dynamic binary translation is a well-known and ubiquitous technique.

To counter program code emulation, creators of malicious programs use various approaches, which tend to exploit limitations of the emulation process and to the design of the emulator in antivirus solutions. One of these approaches involves adding a large number of instructions to the program code, which do not carry a malicious component but require excessive time for emulation. Taking into account the fact that the time allocated for the program code emulation is limited to avoid user dissatisfaction (this time can usually be a few seconds), the emulation process can stop before the execution of the malicious code.

One of the techniques for countering such an approach is described in U.S. Pat. No. 7,603,713, the disclosure of which is incorporated by reference herein. Its operation includes the execution of a number of instructions on an actual processor, rather than in an emulator utilizing dynamic binary translation, thereby significantly accelerating the emulation of unknown applications.

Although this approach can be quite beneficial to reducing the time needed to execute large numbers of instructions, certain drawbacks remain. One such drawback relates to the fact that the accelerated execution of instructions using an actual processor stops, for example, when an exception e.g., having to respond to an API function call. Taking into account that the emulation accelerator needs initialization, which tends to be a resource-consuming process, the accelerator can be of only marginal benefit, or even counter-productive, in certain cases where it executes only a few instructions before having to return execution back to the usual emulator.

Accordingly, there is a need for an effective solution that improves the efficiency of emulation acceleration.

SUMMARY OF THE INVENTION

One aspect of the invention is directed to a method for emulating software code under investigation utilizing a computer system that includes computing hardware, including at least one processor, and data storage. According to the method, a virtual execution environment is executed in which a first portion of the software code under investigation is emulated, and where a series of virtual processing states are represented during emulation of this first portion. The virtual execution environment can utilize dynamic binary translation, as an example.

A second portion of the software code is executed without emulation thereof. For example, the second portion can be executed on the at least one processor without dynamic binary translation.

Prior to executing the second portion of the software code without emulation, the computing hardware is initialized according to one of the series of virtual processing states that preceded the second portion of the software code. A measure of efficiency is determined for the executing of the second portion of the software code without emulation. The suitability of execution of the second portion of the software code without emulation is determined based on a comparison of the measure of efficiency against an efficiency criterion. These actions are carried out by the computing hardware operating under program control.

In another aspect of the invention, a security arrangement for detecting malware in a software code under investigation includes computing hardware, comprising at least one processor, and data storage, with the data storage containing instructions that, when executed, cause the computing hardware to establish an emulator system. The emulator system includes a virtual execution environment in which a series of virtual processing states are represented during emulation of a first portion of the software code, and a hardware accelerator module that performs an initialization of the computing hardware to directly execute a second portion of the software code under investigation without emulation thereof in the virtual execution environment. The system further includes an efficiency assessment module that determines a measure of efficiency of performing the executing of the second portion of the software code under investigation without emulation thereof, and an acceleration decision module that performs selection of the second portion of the software code under investigation to be directly executed by the hardware accelerator module based on the determined measure of efficiency.

BRIEF DESCRIPTION OF THE DRAWINGS

The invention may be more completely understood in consideration of the following detailed description of various embodiments of the invention in connection with the accompanying drawings, in which.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention as defined by the appended claims.

DETAILED DESCRIPTION OF THE PREFERRED EMBODIMENTS

Figure 1:
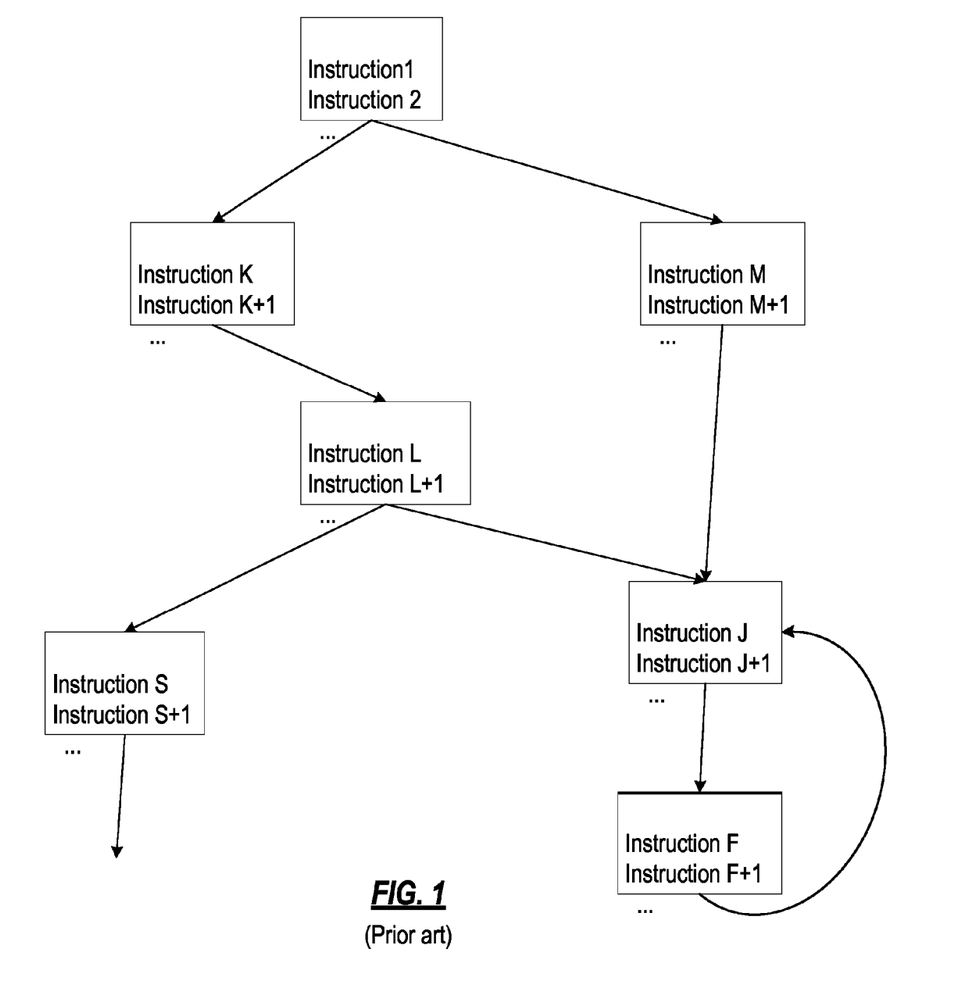
FIG. 1 is a diagram illustrating an example of a typical application execution sequence represented by base blocks.

FIG. 1 is a diagram illustrating an example of a typical application execution sequence represented by base blocks, i.e. a sequence of machine instructions executed successively until a transfer of control is encountered. In this example, the base blocks are depicted as rectangles containing instructions and linked by transitions, both conditional and unconditional. In the assembly language, instructions can be represented by commands, like MOV, ADD, LEA and others; instructions JZ or JNA can be viewed as examples of conditional transitions; in contrast, JMP can be viewed as an example of an unconditional transition instruction. It is important to note that most of the code is executed not once but several times; this being due to the fact that the execution of the code mostly involves execution of cycles and subroutines. This is especially relevant for malicious applications which oftentimes use code compression techniques such as, for example, those described in Saumya Debray et al., Compiler Techniques for Code Compaction, incorporated by reference herein. Before such compressed code can be executed, it is unpacked, which requires a large number of cyclical operations.

Figure 2:
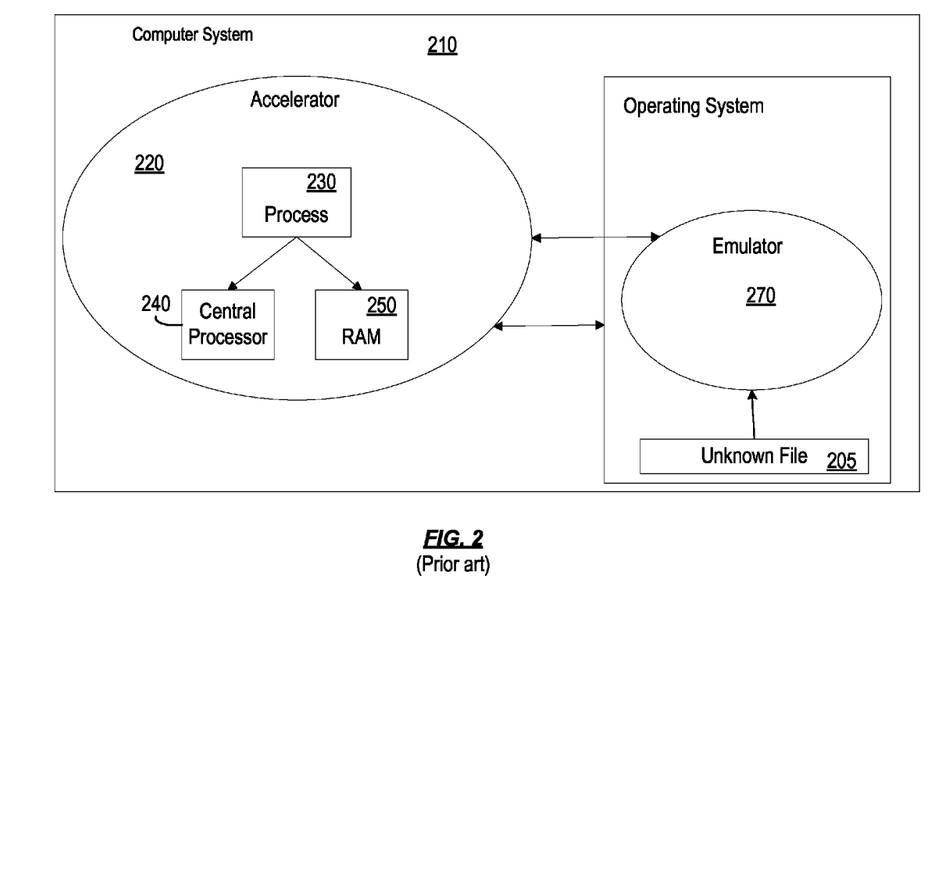
FIG. 2 is a block diagram illustrating a known system of hardware-based acceleration of program emulation.

FIG. 2 illustrates a known system for accelerating the execution of the instructions of an executable program, such as the one described in U.S. Pat. No. 7,603,713, the disclosure of which is incorporated by reference herein. To achieve acceleration in accelerator 220 of process 230 (which was created from the unknown executable file 205 during its emulation), the condition of all registers of the virtual copy of the processor inside emulator 270 is sent directly to the host of computer system 210. The accelerator 220 itself is an isolated environment in which the context of the process 230 (e.g., virtual address space of the process, execution streams, open descriptors of resources such as files or semaphores, etc.) is placed for subsequent execution within host 210, to properly represent what occurs in the execution of an actual process. For some time, the instructions of process 230 are executed on the actual processor until the occurrence of an exception, where control is returned to emulator 270. Examples of such an exception include the execution of an RDTSC (return time stamp counter value) instruction, or repaging. When any one of such exceptions occurs, control is transferred back to emulator 270. Some instructions, such as privileged instructions or RDTSC, are emulated in the usual fashion, i.e., without using accelerator 220. Privileged instructions are operations of input/output to peripheral devices, loading and saving of control registers, clearing of task switching flags, etc.

The analysis of the legitimacy or the process begins in emulator 270, where the first N instructions are processed. N is a verification parameter chosen by an expert. This number can approximately represent from 100 to 10000 instructions. In this case, a heuristic analyzer checks the similarity of the process code being executed to the behavioral patterns of known malicious applications. This is usually done after each instruction, group of instructions, or upon completion of execution. This comparison occurs in response to an execution report on the execution (or, more precisely, emulation of the execution) of a process that is created by the emulator. Based on the execution report, the process is categorized according to the actions that it has made, where it is deemed either safe or malicious.

If the first N instructions do not detect any dangerous signs, the emulator sends the process to the accelerator 220. In order for the accelerator to properly carry out its function, The virtual processing states (e.g., data in registers, key memory locations, etc.) of the emulated system is loaded into the accelerator so that execution can proceed without loss of context. Thereafter, the execution of the process proceeds at the actual processor's operation speed.

However, as it was noted above, the efficiency of the accelerator can be low in the case where, after its resource-consuming initialization, it executes only a few instructions on the actual processor, followed by the occurrence of an exception—for example, exclusion or call of an API function, which will cause the accelerated instruction processing to be returned to the standard emulator. Thus, for subsequent acceleration of the emulation, the accelerator would need to be re-initialized, which consumes quite a number of processor cycles and represents a time delay in the emulation during which no actual emulation is taking place.

Figure 3:
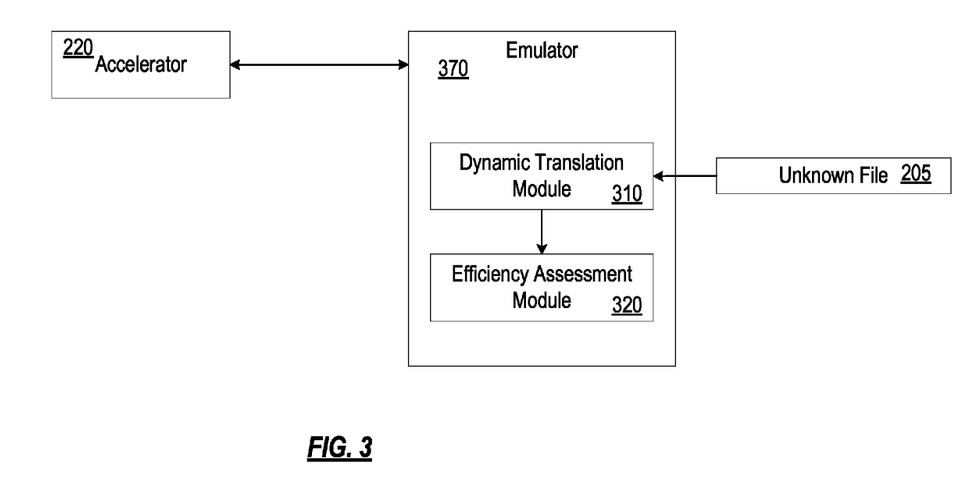
FIG. 3 is a block diagram illustrating an improved system for accelerating emulation according to one embodiment of the invention.

According to one type of embodiment of the invention, the above-described emulation and acceleration process is improved. FIG. 3 is a block diagram illustrating an emulation and emulation acceleration system according to one embodiment. In this exemplary system, improved emulator 370 includes a dynamic translation module 310 and an efficiency assessment module 320.

The term module as used herein means a real-world device, component, or arrangement of components implemented using hardware, such as by an application specific integrated circuit (ASIC) or field-programmable gate array (FPGA), for example, or as a combination of hardware and software, such as by a microprocessor system and a set of program instructions that adapt the module to implement the particular functionality, which (while being executed) transform the microprocessor system into a special-purpose device. A module can also be implemented as a combination of the two, with certain functions facilitated by hardware alone, and other functions facilitated by a combination of hardware and software. In certain implementations, at least a portion, and in some cases, all, of a module can be executed on the processor(s) of one or more computers (e.g., cluster nodes) that execute an operating system, system programs, and application programs, while also implementing the module using multitasking, multithreading, distributed (e.g., cloud) processing where appropriate, or other such techniques. Accordingly, each module can be realized in a variety of suitable configurations, and should generally not be limited to any particular implementation exemplified herein, unless such limitations are expressly called out.

In one embodiment, dynamic translation module 310 is programmed or otherwise configured to perform a dynamic binary translation of the code of an unknown file 205, after which the translated code will be saved in the memory for subsequent calls. The efficiency assessment module 320 is programmed or otherwise configured to assess how efficiently the accelerator 220 has worked. In one embodiment, efficiency E is assessed according to the formula $E=N/K$, where N represents the number of processor cycles spent for processing the instructions using the accelerator 220 and K represents a known or predetermined number of processor cycles needed to transfer the emulation process from the emulator 370 to the Accelerator 220.

According to this embodiment, a decision is made by efficiency assessment module 320 based on the value of E. For instance, if E is less than 1 or only a little greater than 1, the operation of the Accelerator 220 is deemed inefficient. In one example, a sufficiently high efficiency is defined in terms of E being substantially greater than one, i.e. the use of the accelerator 220 was justified by a large number of instructions it had processed.

In various such embodiments, a threshold is defined against which the value E is compared. For instance, the threshold can be set at 1.5, 2, 3, 5, 10, etc. This threshold value can be a fixed quantity according to one embodiment. For instance, it can be based on the relative amount of processor cycles needed to perform dynamic binary translation of instructions, and execution of those translated instructions, compared against the number of processor cycles needed to directly execute non-translated instructions.

In a related embodiment, the threshold is dynamically adjustable. For instance, in one approach, the threshold is automatically adjusted based on certain defined operating conditions or system configurations. For example, the availability of additional processor cores, processor speed, the front-side bus speed, current workload, the nature of other processes being carried out and their relative priority, or any combination thereof, may be taken into account.

In other embodiments, the measure of efficiency can be defined according to a different formula or relationship. More generally, the measure of efficiency can be suitably based on the time or extent of processing required to invoke the accelerator, and relating that time or processing extent to the time or processing work associated with accelerating a portion of the code in question. Thus, in one embodiment, the suitability of execution of a portion of the code without emulation (i.e., using the accelerator) is determined according to an efficiency criterion defined based on a computational load of performance of the execution of that portion of the code compared against a computational load of the performance of the initializing of the accelerator.

In one embodiment, the efficiency assessment module 320 stores the base blocks and/or translated instructions for which sufficient accelerator efficiency was achieved, i.e. the value of E exceeded the threshold. Likewise, in a related embodiment, the base blocks corresponding to low E values are stored.

Dynamic translation module 310 is programmed or otherwise configured to perform dynamic translation of those code instructions of unknown file 205 that correspond to base blocks for which the efficiency E was not sufficiently high, and therefore the use of the accelerator is not worthwhile.

Figure 4:
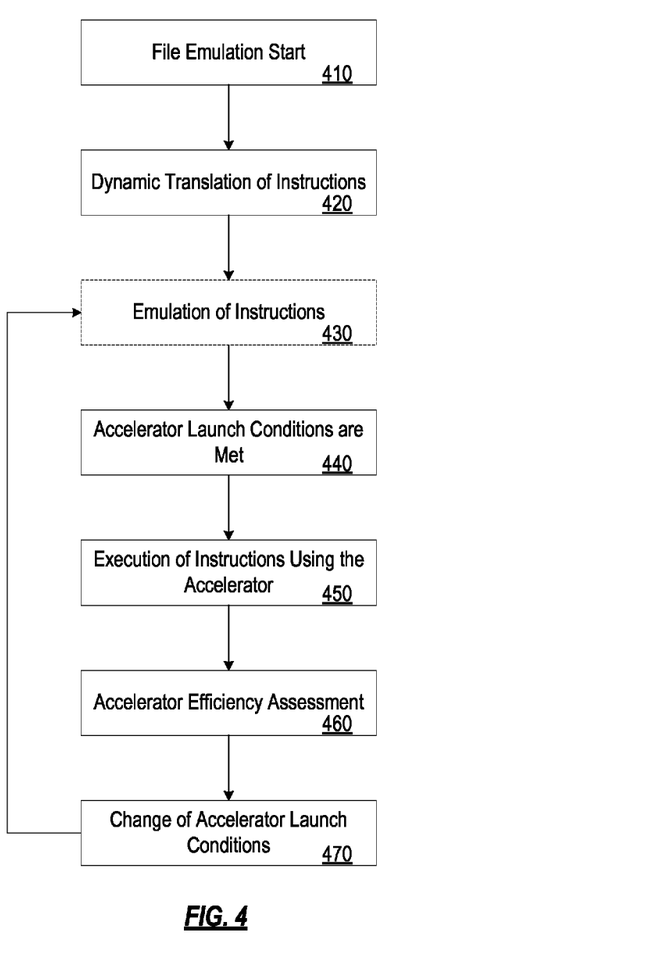
FIG. 4 is a flow diagram illustrating a method for accelerating emulation according to one embodiment of the invention.

FIG. 4 is a flow diagram illustrating a method of selectively applying acceleration of emulation according to one embodiment of the invention. At 410, an unknown file is provided for emulation, and at 420, dynamic translation of the file's instructions begins using the dynamic translation module 310. As emulation of the instructions (already translated at 420) proceeds at 430, accelerator launch conditions are met at a certain stage (e.g., at 440). In the first instance, such launch conditions can be the completion of emulation of a certain number of instructions (for example, the number can vary from 100 to 10000 instructions), and if no suspicious activity was detected corresponding to those instructions, then the accelerator 220 is invoked at 450 in order to accelerate the emulation process. The instructions are executed by accelerator 220 until an exception occurs, e.g., an API function call, which will cause a return to the processing of instructions in the Emulator 370.

Thereafter, at 460, the efficiency of the operation of the accelerator 220 is assessed by efficiency assessment module 320, and the criteria for invoking the accelerator 220 of its launch are changed at 470. In various embodiments, the changing of the criteria for the invocation of the Accelerator 220 involves, for example:

specifying certain base blocks that can be executed using the accelerator 220; or specifying certain instructions from which the emulation process must start.

Advantageously, embodiments of the invention provide selectivity in utilizing the accelerator. In a well-designed system according to embodiments of the invention, the accelerator is selectively invoked for those portions of the code of the unknown program that can be executed efficiently using the accelerator, taking into account the setup time required for each invocation of the accelerator.

Figure 5:
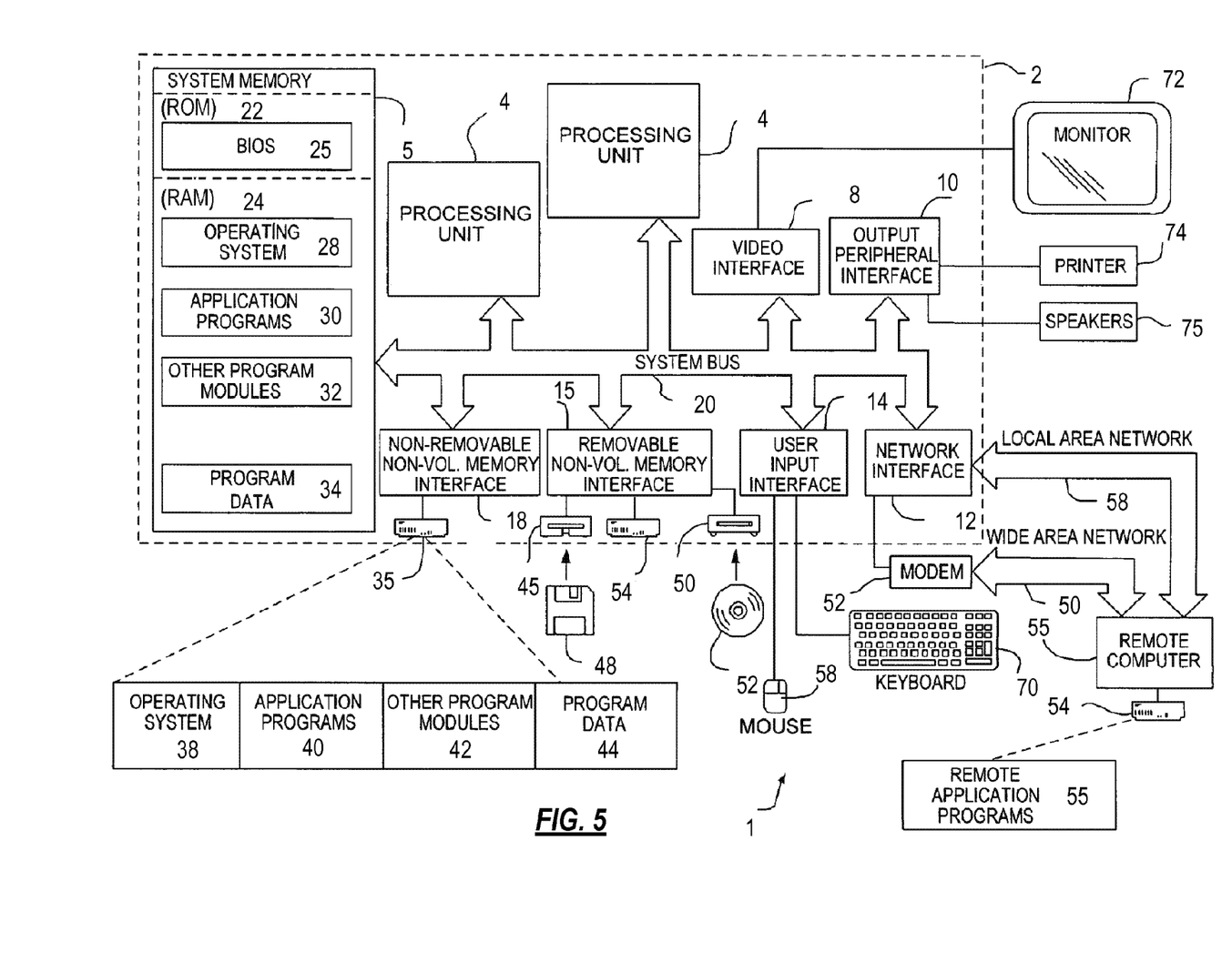
FIG. 5 is a block diagram illustrating an example of a general-purpose computer system on which aspects of the invention may be carried out.

FIG. 5 is a diagram illustrating in greater detail a computer system 1 on which aspects of the invention as described herein may be implemented according to various embodiments. The computer system 1 may include a computing device such as a personal computer 2. The personal computer 2 includes one or more processing units 4, a system memory 6, a video interface 8, an output peripheral interface 10, a network interface 12, a user input interface 14, removable 16 and non-removable 18 memory interfaces and a system bus or high-speed communications channel 20 coupling the various components. In various embodiments, the processing units 4 may have multiple logical cores that are able to process information stored on computer readable media such as the system memory 6 or memory attached to the removable 16 and non-removable 18 memory interfaces 18. The computer 2 system memory 6 may include non-volatile memory such as Read Only Memory (ROM) 22 or volatile memory such as Random Access Memory (RAM) 24. The ROM 22 may include a basic input/output system (BIOS) 26 to help communicate with the other portion of the computer 2. The RAM 24 may store portions of various software applications such as the operating system 28, application programs 30 and other program modules 32. Further, the RAM 24 may store other information such as program or application data 34. In various embodiments, the RAM 24 stores information that requires low-latencies and efficient access, such as programs and data being manipulated or operated on. In various embodiments RAM 24 comprises Double Data Rate (DDR) memory, Error Correcting memory (ECC) or other memory technologies with varying latencies and configurations such as RAMBUS or DDR2 and DDR3. In this way, in various embodiments, the system memory 6 may store the input data store, access credential data store, operating memory data store, instruction set data store, analysis result data store and the operating memory data store. Further, in various embodiments, the processing units 4 may be configured to execute instructions that limit access to the aforementioned data stores by requiring access credential before access to the information is granted.

The removable 16 and non-removable 18 memory interfaces may couple the computer 2 to disk drives 36 such as SSD or rotational disk drives. These disk drives 36 may provide further storage for various software applications such as the operating system 38, application programs 40 and other program modules 42. Further, the disk drives 36 may store other information such as program or application data 44. In various embodiments, the disk drives 36 store information that doesn't require the same low-latencies as in other storage mediums. Further, the operating system 38, application program 40 data, program modules 42 and program or application data 44 may be the same information as that stored in the RAM 24 in various embodiments mentioned above or it may be different data potentially derivative of the RAM 24 stored data.

Further, the removable non-volatile memory interface 16 may couple the computer 2 to magnetic portable disk drives 46 that utilize magnetic media such as the floppy disk 48, Iomega® Zip or Jazz, or optical disk drives 50 that utilize optical media 52 for storage of computer readable media such as Blu-Ray®, DVD-R/RW, CD-R/RW and other similar formats. Still other embodiments utilize SSD or rotational disks housed in portable enclosures to increase the capacity of removable memory.

The computer 2 may utilize the network interface 12 to communicate with one or more remote computers 56 over a local area network (LAN) 58 or a wide area network (WAN) 60. The network interface 12 may utilize a Network Interface Card (NIC) or other interface such as a modem 62 to enable communication. The modem 62 may enable communication over telephone lines, coaxial, fiber optic, powerline, or wirelessly. The remote computer 56 may contain a similar hardware and software configuration or may have a memory 64 that contains remote application programs 66 that may provide additional computer readable instructions to the computer 2. In various embodiments, the remote computer memory 64 can be utilized to store information such as identified file information that may be later downloaded to local system memory 6. Further, in various embodiments the remote computer 56 may be an application server, an administrative server, client computers, or a network appliance.

A user may enter information to the computer 2 using input devices connected to the user input interface 14 such as a mouse 68 and keyboard 70. Additionally, the input device may be a trackpad, fingerprint scanner, joystick, barcode scanner, media scanner or the like. The video interface 8 may provide visual information to a display such as a monitor 72. The video interface 8 may be an embedded interface or it may be a discrete interface. Further, the computer may utilize a plurality of video interfaces 8, network interfaces 12 and removable 16 and non-removable 18 interfaces in order to increase the flexibility in operation of the computer 2. Further, various embodiments utilize several monitors 72 and several video interfaces 8 to vary the performance and capabilities of the computer 2. Other computer interfaces may be included in computer 2 such as the output peripheral interface 10. This interface may be coupled to a printer 74 or speakers 76 or other peripherals to provide additional functionality to the computer 2.

Various alternative configurations and implementations of the computer are within the spirit of the invention. These variations may include, without limitation, additional interfaces coupled to the system bus 20 such as universal serial bus (USB), printer port, game port, PCI bus, PCI Express or integrations of the various components described above into chipset components such as the northbridge or southbridge. For example, in various embodiments, the processing unit 4 may include an embedded memory controller (not shown) to enable more efficient transfer of data from the system memory 6 than the system bus 20 may provide.

The embodiments above are intended to be illustrative and not limiting. Additional embodiments are within the claims. In addition, although aspects of the present invention have been described with reference to particular embodiments, those skilled in the art will recognize that changes can be made in form and detail without departing from the spirit and scope of the invention, as defined by the claims.

Persons of ordinary skill in the relevant arts will recognize that the invention may comprise fewer features than illustrated in any individual embodiment described above. The embodiments described herein are not meant to be an exhaustive presentation of the ways in which the various features of the invention may be combined. Accordingly, the embodiments are not mutually exclusive combinations of features; rather, the invention may comprise a combination of different individual features selected from different individual embodiments, as understood by persons of ordinary skill in the art.

Any incorporation by reference of documents above is limited such that no subject matter is incorporated that is contrary to the explicit disclosure herein. Any incorporation by reference of documents above is further limited such that no claims that are included in the documents are incorporated by reference into the claims of the present Application. The claims of any of the documents are, however, incorporated as part of the disclosure herein, unless specifically excluded. Any incorporation by reference of documents above is yet further limited such that any definitions provided in the documents are not incorporated by reference herein unless expressly included herein.

For purposes of interpreting the claims for the present invention, it is expressly intended that the provisions of Section 112, sixth paragraph of 35 U.S.C. are not to be invoked unless the specific terms "means for" or "step for" are recited in a claim.

What is claimed is:

1. In a computer system that includes computing hardware, including at least one processor, and data storage, a method for emulating an object of software code under investigation, the method comprising:

executing, by the computing hardware operating under program control, a virtual execution environment in which a first portion of the object of software code under investigation is emulated, wherein a series of virtual processing states are represented during emulation of the first portion;

executing, by the computing hardware, a second portion of the object of software code under investigation without emulation thereof;

prior to the executing of the second portion of the object of software code without emulation, initializing the computing hardware according to one of the series of virtual processing states that preceded the second portion of the object of software code;

determining, by the computing hardware operating under program control, a measure of efficiency for the executing of the second portion of the object of software code without emulation; and determining, by the computing hardware operating under program control, suitability of execution of the second portion of the object of software code without emulation, wherein determining of the suitability is based on a comparison of the measure of efficiency against an efficiency criterion.

2. The method of claim 1, wherein in the determining of the suitability of execution of the second portion without emulation, the efficiency criterion is defined based on a computational load of performance of the execution of the second portion compared against a computational load of the performance of the initializing of the computing hardware.

3. The method of claim 2, wherein the measure of efficiency is defined based on a ratio of a measured number of processor cycles in carrying out the performance of the executing of the second portion of the object of software code under investigation without emulation thereof with a number of processor cycles associated with carrying out the performance of the initializing of the computing hardware.

4. The method of claim 1, wherein emulation of the first portion of the object of software code includes performing dynamic binary translation of the first portion.

5. The method of claim 1, wherein the executing of the second portion of the object of software code under investigation without emulation thereof includes performing binary translation of one or more parts of the second portion in response the determined measure of efficiency for the second portion being lower than a predefined efficiency threshold.

6. The method of claim 1, wherein the object of software code under investigation is structured as a plurality of base blocks, and wherein the measure of efficiency is associated with a corresponding base block that is executed by the computing hardware as the second portion of the object of software code under investigation.

7. The method of claim 1, wherein the object of software code under investigation includes a plurality of investigated instructions and wherein the measure of efficiency is associated with a corresponding one or more of the investigated instructions that are to be executed by the hardware accelerator module as the second portion of the object of software code under investigation.

8. The method of claim 1, wherein determining the suitability of execution of the second portion of the object of software code without emulation is based on a comparison of the measure of efficiency against a minimum efficiency threshold, wherein when the measure of efficiency is below a minimum efficiency threshold of the efficiency criterion the second portion is executed in the virtual execution environment.

9. A security arrangement for detecting malware in an object of software code under investigation, the security arrangement comprising:

computing hardware, including at least one processor, and data storage, the data storage containing instructions that, when executed, cause the computing hardware to establish an emulator system including:

a virtual execution environment in which a series of virtual processing states are represented during emulation of a first portion of the object of software code;

a hardware accelerator module that performs an initialization of the computing hardware to directly execute a second portion of the object of software code under investigation without emulation thereof in the virtual execution environment;

an efficiency assessment module that determines a measure of efficiency of performing the executing of the second portion of the object of software code under investigation without emulation thereof; and an acceleration decision module that performs selection of the second portion of the object of software code under investigation to be directly executed by the hardware accelerator module based on the determined measure of efficiency.

10. The security arrangement of claim 9, wherein the efficiency assessment module relates a computational load of the performance of the executing of the second portion of the object of software code under investigation without emulation thereof to a computational load of the performance of the initialization of the computing hardware to determine the measure of efficiency.

11. The security arrangement of claim 10, wherein the measure of efficiency is defined based on a ratio of a measured number of processor cycles in carrying out the performance of the executing of the second portion of the object of software code under investigation without emulation thereof to a number of processor cycles associated with carrying out the performance of the initialization of the computing hardware.

12. The security arrangement of claim 9, wherein the virtual execution environment performs emulation of the second portion in response to the determined measure of efficiency for the second portions being lower than a predefined efficiency threshold.

13. The security arrangement of claim 9, wherein the object of software code under investigation is structured as a plurality of base blocks and wherein the efficiency assessment module associates the measure of efficiency with a corresponding base block that is executed by the hardware accelerator module as the second portion of the object of software code under investigation.

14. The security arrangement of claim 9, wherein the object of software code under investigation includes a plurality of investigated instructions and wherein the efficiency assessment module associates the measure of efficiency with a corresponding one or more of the investigated instructions that are to be executed by the hardware accelerator module as the second portion of the object of software code under investigation.

15. The security arrangement of claim 9, wherein the acceleration decision module performs selection of the second portion of the object of software code under investigation based on a comparison of the measure of efficiency against a minimum efficiency threshold, wherein when the measure of efficiency is below the minimum efficiency threshold for a particular second portion of the object of software code that particular second portion of the object of software code, when subsequently encountered, is deemed a first portion and directed to the virtual execution environment for emulation therein.

16. The security arrangement of claim 9, wherein the acceleration decision module modifies the selection of the second portion of the object of software code under investigation based on the measure of efficiency.

17. The security arrangement of claim 9, wherein the emulator system further comprises:
   a malicious code detection module that detects malicious code from among the first portion of the object of software code under investigation in response to emulation of the first portion in the virtual execution environment.

18. The security arrangement of claim 9, wherein the virtual execution environment is executed on the at least one processor.

\* \* \* \* \*